(12) United States Patent
Lee et al.

(10) Patent No.: US 10,669,838 B2
(45) Date of Patent: Jun. 2, 2020

(54) MECHANICAL INTEGRITY TEST SYSTEM AND METHOD OF USING SAME

(71) Applicant: Big Guns Energy Services Inc., Calgary (CA)

(72) Inventors: Dickson Lee, Calgary (CA); Vivian Yuen-Lee, Calgary (CA)

(73) Assignee: BIG GUNS ENERGY SERVICES INC., Calgary (CA)

( * ) Notice: Subject to any disclaimer, the term of this patent is extended or adjusted under 35 U.S.C. 154(b) by 0 days.

(21) Appl. No.: 16/156,883

(22) Filed: Oct. 10, 2018

(65) Prior Publication Data
US 2019/0106984 A1 Apr. 11, 2019

Related U.S. Application Data

(60) Provisional application No. 62/570,172, filed on Oct. 10, 2017.

(51) Int. Cl.
*E21B 47/10* (2012.01)
*G01V 5/12* (2006.01)
*G01N 9/24* (2006.01)

(52) U.S. Cl.
CPC ........ *E21B 47/1015* (2013.01); *E21B 47/102* (2013.01); *G01V 5/125* (2013.01);
(Continued)

(58) Field of Classification Search
CPC ........ E21B 43/24; E21B 36/04; E21B 17/028; E21B 36/001; E21B 43/12; E21B 43/243; E21B 43/2401; E21B 43/122; E21B 43/38; E21B 47/01; E21B 47/10; E21B 47/122; E21B 21/08
See application file for complete search history.

(56) References Cited

U.S. PATENT DOCUMENTS 3,564,251 A 2/1971 Youmans
4,958,073 A 9/1990 Becker
(Continued)

FOREIGN PATENT DOCUMENTS

DE 10034810 1/2002
WO 2016032422 3/2016

*Primary Examiner* — Zakiya W Bates
(74) *Attorney, Agent, or Firm* — Snell & Wilmer L.L.P.; Russell T. Manning

(57) ABSTRACT

A system for more accurate mechanical integrity testing of a borehole and cavity has a mechanical integrity testing tool suspended by a wireline from surface to a test depth. Distributed temperature and acoustic sensing systems respectively record distributed temperature and noise measurements along the wireline. First and second pressure sensors measure uphole and downhole pressures. The mechanical integrity testing tool has an interface detection device, which can have an Iridium-192 gamma ray source having a shorter half-life relative to conventional sources. The interface level, distributed temperature measurements, and uphole and downhole pressure measurements can be used to calculate the volume and/or mass of test fluid that has leaked out of the borehole and/or cavity over the test period. The acoustic sensing system can be used to detect and confirm the presence of a leak. The temperature and/or acoustic sensing systems can be used to identify the location of the leak.

19 Claims, 5 Drawing Sheets

(52) U.S. Cl.
CPC ....... *G01N 9/24* (2013.01); *G01N 2223/1013* (2013.01); *G01N 2223/205* (2013.01)

(56) References Cited

U.S. PATENT DOCUMENTS

| | | | |
|---|---|---|---|
| 5,763,886 A | | 6/1998 | Schulte |
| 5,892,148 A | * | 4/1999 | Durup ................. E21B 41/0057 405/53 |
| 6,666,285 B2 | | 12/2003 | Jones |
| 6,738,720 B2 | | 5/2004 | Odom |
| 7,469,033 B2 | | 12/2008 | Kulik |
| 8,047,285 B1 | * | 11/2011 | Smith ....................... E21B 4/02 166/260 |
| 8,306,187 B2 | | 11/2012 | Kulik |
| 8,983,028 B2 | | 3/2015 | Kulik |
| 9,975,701 B2 | * | 5/2018 | McCoy ................... G01M 3/26 |
| 2010/0017134 A1 | | 1/2010 | Steinman |
| 2014/0083683 A1 | * | 3/2014 | Tips ....................... E21B 47/12 166/250.01 |
| 2016/0238503 A1 | | 8/2016 | Orion |

* cited by examiner

MECHANICAL INTEGRITY TEST SYSTEM AND METHOD OF USING SAME

CROSS-REFERENCE TO RELATED APPLICATIONS

This application claims the benefit of U.S. Provisional Patent Application No. 62/570,172, filed Oct. 10, 2017, the entirety of which is incorporated herein by reference.

TECHNICAL FIELD

A system and method for conducting cavern mechanical integrity tests is provided. More particularly, a system and method for improved measurement of wellbore and cavern parameters and improved downhole interface detection in mechanical integrity testing is provided.

BACKGROUND

Hydrocarbons are sometimes stored or otherwise located in subterranean caverns. Such caverns may be formed by lowering a tubing string down a borehole into salt deposits and introducing water downhole through the tubing to dissolve the salt and create a cavern. The borehole itself can be uncased (i.e. an open wellbore) or cased, typically with a steel casing. A large amount of brine is produced from such a process, some of which fills the cavern and borehole and some of which is removed, such as to a brine pond.

A fluid that is desired to be stored in the cavern, such as a liquefied or gaseous hydrocarbon, can be introduced into the cavern through the borehole via the tubing string or the annular space between the borehole and the tubing string, resulting in an interface between the fluid to be stored and brine that moves progressively downward as the fluid is injected. As a result, brine is urged upward through the tubing string or annulus into a brine pond or elsewhere for disposal and/or storage.

An issue associated with such storage of hydrocarbons in an underground cavern is the potential leakage of the stored hydrocarbons out of the cavern or borehole and into the surrounding formation, which can lead to contamination of nearby water deposits from which drinking water may be pumped, or other catastrophic consequences such as a blow-out, creation of a sinkhole, or gas leakage into the atmosphere. Consequently, various government regulatory agencies have required that caverns for storing hydrocarbons be tested for mechanical integrity to determine the rate of leakage therefrom.

Mechanical integrity testing (MIT) typically involves filling the storage cavern with brine and injecting a test fluid, such as nitrogen or a liquid hydrocarbon, into the brine-filled cavern via the annulus so as to form a fluid interface between the brine and test fluid. The borehole is then capped and the interface is observed over a period of time until a minimum detectable leak rate (MDLR) is detected. Movement of the fluid interface and/or other borehole conditions are observed and interpreted to determine the presence of a leak. For example, a rise in the interface may indicate leakage of test fluid into the surrounding formation, and a lowering of the interface may indicate leakage of brine out of the cavern. The volume of test fluid that has leaked into the surrounding formation can be determined by calculating the volume of the section of borehole defined by the level of the interface at the beginning of the test period and the level of the interface at the end of the test period, while accounting for interface movement due to fluid volume changes caused by fluctuations in temperature and pressure in the borehole during the test period. Fluid leakage typically occurs near the casing shoe adjacent the bottom of the borehole, or through the casing. As such, the test fluid/brine interface is typically located below and adjacent to the bottom of the borehole or the casing shoe. The location of the interface is selected depending on the characteristics of each well such that the interface ideally does not rise above the casing shoe or enter into the larger part of the cavern, as this could potentially interfere with, or void, the MIT test results. Liquid hydrocarbon is often used in place of nitrogen for MITs in older caverns, as such caverns may not have been designed to hold the nitrogen pressure in the upper section of the borehole.

During an MIT test, the level of the brine/test fluid interface can be monitored by an interface detection device such as a pulsed neutron tool configured to perform a neutron survey. However, if the interface is a liquid hydrocarbon/brine interface where hydrogen contents are similar, or there is foam and/or an oil film formed by liquid hydrocarbons such as diesel on top of the brine, the neutron tool's ability to accurately locate the interface deteriorates. Foaming in storage caverns is fairly common, as salt caverns are typically used for hydrocarbon storage. Additionally, a pulsed neutron tool requires about 20 minutes to "calm down" excited neutrons after acquiring a spot reading before the next reading can be taken, resulting in substantial periods of idling while waiting for the neutron tool to prepare for the next reading.

The drawbacks of using a pulsed neutron tool may be addressed by using a density logging tool based on gamma ray scattering and photoelectric absorption to locate the brine/test fluid interface. Such a tool is not affected by the presence of foam or oil film, and does not require a calming down period. Additionally, specifically designed density logging tools can achieve relatively higher vertical resolution compared to pulsed neutron tools. For example, density logging tools can have a resolution of about 5 cm compared to pulsed neutron tools, which typically have a resolution of about 25 cm. As the time required to calculate the MDLR is proportional to the resolution of the interface detection tool, using the CSA Z341 standard formula:

$$T = \frac{V \times R \times 365 \text{ days/year} \times 24 \text{ hours/day}}{160 \ m^3/\text{year}}$$

where
T=duration of the MIT test in hours,
V=unit annular volume of casing in $m^3/m$, and
R=resolution of the interface tool in meters,
density logging tools can provide substantially shorter MIT testing periods compared to pulsed neutron tools.

However, existing density tools are made for open-hole logging environments and do not emit sufficient energy to penetrate through steel tubing and/or inner casing to detect the interface in cased wellbore environments. Further, existing gamma ray density tools use Cesium-137 as a gamma ray source, which possesses a half-life of 30.5 years. Consequently, such tools pose a severe environmental risk, as it would take more than 150 years, or about five half-lives, for the Cesium-137 gamma ray source to decay to an acceptable level in the event that the density tool is lost in the cavern, for example if the tool is accidentally run too far into the cavern and cannot be recovered. If a Cesium-137 gamma ray source is lost in a cavern, the Canadian Nuclear Safety Commission requires that the well/cavern be abandoned. Given the substantial environment, health, and economic risks associated with the use of a Cesium-137 based gamma ray source, such density tools are not in popular use, despite its effectiveness in detecting the brine/test fluid interface in cased and open wellbore environments and the advantages it offers over a pulsed neutron tool.

Other gamma ray sources having shorter half-lives, such as Cobalt-60 and Iodine-131, may be used in place of Cesium-137 to mitigate the environmental risk. However, Cobalt-60 still has a relatively long half-life of 5.2 years, while Iodine only has a half-life of 8 days, which presents operational difficulties, as MIT tests can have a duration that exceeds 8 days.

As mentioned above, borehole pressure and temperature must also be measured during MIT procedures to account for their effects on the interface depth during the test period, such that interface movement caused by temperature and pressure changes is not misinterpreted as fluid leakage. During conventional MIT testing, well temperature is measured by means of a temperature survey conducted typically from surface to 15 meters below the test fluid/brine interface. Temperature surveys are usually performed before injection of test fluid, at the beginning of the MIT test period, and at the end of the test period. The downhole temperature or an average temperature calculated from the temperature surveys are used to represent the temperature of the well before and after the MIT. In Alberta, Canada, caverns in bedded salt formations are typically 1400 to 2000 meters deep. Given a log rate of 360-600 m/hr, it takes the logging tool approximately 3.5 hours to run a temperature survey for the entire test interval. As a result, the temperature and gas constants of the well at shallower depths may have changed by the time the logging tool reaches the bottom of the test interval, leading to inaccurate wellbore temperature calculations, and in turn inaccurate fluid leakage calculations. Additionally, as only the temperature average is used, conventional MIT techniques do not account for local temperature variations along the test interval that may affect the accuracy of calculations of test fluid leakage.

Further, measurements of wellbore pressure are typically only taken at the wellhead or surface, and no downhole pressure measurements are taken. As the density of the test fluid and brine are only spot measured, and the density of test fluid can change after it is injected into the cavern, the hydrostatic head or downhole pressure is only an estimate, which can result in inaccurate calculations of fluid leakage.

In conventional MIT procedures, if a leak is detected, the leak must be located through additional testing procedures after the initial MIT procedure. For example, wellbore acoustic noise can be logged by running a noise logging tool down the borehole to detect an acoustic signature that is indicative of a leak. As noise logs are typically performed by running the logging tool from the designated depth to surface, the movement of the noise logging tool itself can also induce noise in the wellbore and produce false results. Typically, no wellbore noise measurements are taken during the MIT procedure. Alternatively, or additionally, borehole temperature can be logged again to detect temperature anomalies, such as an abrupt drop in temperature that may be indicative of a leak. Further, a joint-by-joint pressure test may be performed for the entire test interval to detect a pressure drop that suggests a leak.

The lack of accurate and timely wellbore temperature, pressure, and noise measurements all contribute to a greater risk of inaccurate calculations in MIT testing and consequently a greater risk of undetected leakage or inaccurate leakage calculations.

There is a need for a system and method of performing MITs that provides for more accurate and timely temperature and pressure readings, accounts for local temperature variations along the test interval, and enables measurement of wellbore noise. Further, there is a need for a method and system for quickly and accurately locating the brine/test fluid interface during MIT of a storage cavern without the risks associated with a density tool having a Cesium-137 gamma ray source.

SUMMARY OF THE INVENTION

A system and method for conducting mechanical integrity testing of a borehole and underground cavity are disclosed herein. The system comprises a wireline having at least a conductor, a first optical fiber, and a second optical fiber. A control system is connected to the conductor and the first and second optical fibers at a surface end of the wireline. The control system can form a distributed temperature sensing system with the first optical fiber to measure and record temperatures at a first plurality of axial segments along the first optical fiber from surface to about a test depth where a test fluid/brine interface is located. The control system can also form a distributed acoustic sensing system with the second optical fiber to measure and record noise readings at a second plurality of axial segments along the second optical fiber from surface to about the test depth. The system further comprises at least first and second pressure sensors for measuring pressure at an upper section of the borehole and at about the test depth. A mechanical integrity testing tool is connected to the conductor and a downhole end of the wireline and comprises an interface detection device configured to detect the location of the interface. The interface detection device can be an Iridium-192 gamma ray source, which has a much shorter half-life than conventional Cesium-137 sources, while still being long enough to be used for MIT procedures. The second pressure sensor can be located on the mechanical integrity testing tool.

The method for conducting the mechanical integrity test can comprise recording the interface level for at least the beginning and end of the MIT test period with the interface detection device, recording temperature measurements at the first plurality of axial segments for at least the beginning and end of the test period using the distributed temperature sensing system, and recording pressure measurements at at least the upper section of the borehole and the test depth for at least the beginning and end of the test period with the first and second temperature sensors. The volume and/or mass of test fluid that has leaked out of the borehole and/or cavern over the test period can be calculated using the interface level, temperature, and pressure measurements. Additionally, the distributed acoustic sensing system can be used to independently detect and confirm the presence of a leak in the borehole and/or cavern. The temperature and/or acoustic sensing systems can also be used to identify the location of the leak without the need for running additional equipment into the borehole after the MIT procedures.

The inclusion of distributed temperature and acoustic sensing systems, as well as uphole and downhole pressure sensors, in the MIT system allows for more accurate real-time or near real-time pressure and distributed temperature and noise measurements, thus mitigating the risk of obtaining poor wellbore temperature measurements due to changes in the wellbore temperature during the time it takes the tool to reach the bottom of the test interval using traditional temperature logging methods, or inaccurate approximations of downhole pressure based solely on uphole pressure readings. Additionally, the ability to acquire temperature data for the first plurality of axial segments enables the MIT test to account for local changes in temperature over the test period.

In a broad aspect, a system for conducting mechanical integrity testing of a borehole and underground cavity having a test fluid/brine interface therein can comprise a wireline having at least a conductor, a first optical fiber, and a second optical fiber extending from surface through the borehole to about a test depth adjacent the interface; a control system operatively connected to the conductor and the first and second optical fibers at a surface end of the wireline and configured to emit at least a first laser beam through the first optical fiber and analyze the at least first laser beam to measure and record temperatures at a first plurality of axial segments along the first optical fiber, and emit at least a second laser beam through the second optical fiber and analyze the at least second laser beam to measure and record noise readings at a second plurality of axial segments along the second optical fiber; a first pressure sensor operatively connected to the control system and configured to detect an uphole pressure at an upper section of the borehole; and a mechanical integrity testing tool connected to the conductor and a downhole end of the wireline and having an interface detection device configured to detect the location of the interface and at least a second pressure sensor configured to detect a downhole pressure at about the test depth.

In an embodiment, the mechanical integrity testing tool further comprises at least one temperature sensor.

In an embodiment, the interface detection device comprises a density logging device having an Iridium-192 gamma ray source and at least one gamma ray detector, and a radiation shield located on the mechanical integrity testing tool and configured to shield the mechanical integrity testing tool from direct gamma radiation from the gamma ray source while allowing backscattered gamma radiation to reach the at least one gamma ray detector.

In an embodiment, the first and second pluralities of axial segments comprise coincident axial segments, the length of each axial segment being about 1 meter or less.

In an embodiment, the system comprises at least a third pressure sensor located on the wireline.

In another broad aspect, a method for conducting a mechanical integrity test of a borehole and underground cavity having a test fluid/brine interface therein can comprise injecting the test fluid into the borehole to position the interface at a test depth; confirming that a pressure in the borehole is at a test pressure; closing off the borehole from surface; recording an interface level of the interface at a first time and a second time later than the first time, the first time and second time defining a test period; acquiring temperature measurements at a first plurality of axial segments between surface and the test depth at the first time and the second time; acquiring pressure measurements at the first time and the second time, the pressure measurements comprising at least an uphole pressure at an upper section of the borehole and a downhole pressure at about the test depth; and determining whether test fluid and/or brine has leaked out of the borehole or cavity using the interface level, temperature, and pressure measurements.

In an embodiment, the length of each segment of the first plurality of axial segments is about 1 meter long or less.

In an embodiment, the method further comprises acquiring acoustic noise measurements at a second plurality of axial segments between the surface and the test depth and wherein the step of determining whether test fluid and/or brine has leaked out of the system further comprises using the acoustic noise measurements.

In an embodiment, the method further comprises the step of identifying the location of a leak using the acoustic noise measurements.

In an embodiment, the second plurality of axial segments are coincident and coextensive with the first plurality of axial segments.

In an embodiment, the steps of recording an interface level, acquiring temperature measurements, and acquiring pressure measurements are performed in substantially real-time.

In an embodiment, the steps of recording an interface level, acquiring temperature measurements, and acquiring pressure measurements further comprise recording an interface level, acquiring temperature measurements, and acquiring pressure measurements at at least a third time between the first time and second time.

In an embodiment, the method further comprises the step of identifying the location of a leak by using the temperature measurements to locate a temperature anomaly indicative of a leak.

In an embodiment, the step of acquiring pressure measurements further comprises acquiring additional pressure measurements at one or more locations between the upper section of the borehole and the test depth.

In an embodiment, the step of acquiring pressure measurements further comprises calculating a borehole pressure gradient using the pressure measurements.

In an embodiment, the step of determining whether test fluid and/or brine has leaked out of the borehole or cavity further comprises determining a leaked volume of test fluid over the test period for each segment of the first plurality of axial segments.

In an embodiment, the step of determining whether test fluid and/or brine has leaked out of the borehole or cavity further comprises determining the total leaked volume of test fluid using the equation $$V_{loss} = \sum_{i=1}^{n} \left\{ V_{i1} - V_{i2} \left( \frac{T_{i1}}{T_{i2}} \frac{P_{i2}}{P_{i1}} \right) \right\},$$

where: $V_{loss}$ is the total leaked volume of test fluid; $P_{i1}$ is a borehole pressure at an axial segment i at the first time; $V_{i1}$ is a volume of test fluid at axial segment i at the first time; $T_{i1}$ is a borehole temperature at axial segment i at the first time; $P_{i2}$ is a borehole pressure at axial segment i at the second time; $V_{i2}$ is a volume of test fluid at axial segment i at the second time; and $T_{i2}$ is a borehole temperature at axial segment i at the second time.

In an embodiment, the step of determining whether test fluid and/or brine has leaked out of the borehole or cavity further comprises determining the total leaked volume of test fluid using the equation $$V_{loss} = \sum_{i=1}^{n} \left\{ V_{i1} - V_{i2} \left( \frac{T_{i1}}{T_{i2}} \frac{P_{i2}}{P_{i1}} \frac{Z_{i1}}{Z_{i2}} \right) \right\},$$

where: $V_{loss}$ is the total leaked volume of test fluid; $P_{i1}$ is a borehole pressure at an axial segment i at the first time; $V_{i1}$ is a volume of test fluid at axial segment i at the first time; $T_{i1}$ is a borehole temperature at axial segment i at the first time; $Z_{i1}$ is a compressibility factor of the test fluid at axial segment i at the first time; $P_{i2}$ is a borehole pressure at axial segment i at the second time; $V_{i2}$ is a volume of test fluid at axial segment i at the second time; $T_{i2}$ is a borehole temperature at axial segment i at the second time; and $Z_{i2}$ is a compressibility factor of the test fluid at axial segment i at the second time.

In an embodiment, the step of determining whether test fluid and/or brine has leaked out of the system further comprises determining a mass loss of test fluid over the test period for each segment of the first plurality of axial segments.

In an embodiment, the step of determining whether test fluid and/or brine has leaked out of the borehole or cavity further comprises determining the total mass loss of test fluid using the equation $$m_{loss} = \sum_{i=1}^{N} \left\{ \frac{MV_i}{R} \left( \frac{P_{i1}}{Z_{i1}T_{i1}} - \frac{P_{i2}}{Z_{i2}T_{i2}} \right) \right\},$$

where: $m_{loss}$ is the total mass loss of test fluid; $V_i$ is the volume of test fluid at an axial segment I; M is the molar mass of the test fluid; R is the real gas constant; $P_{i1}$ is a borehole pressure at axial segment i at the first time; $V_{i1}$ is a volume of test fluid at axial segment i at the first time; $T_{i1}$ is a borehole temperature at axial segment i at the first time; $Z_{i1}$ is a compressibility factor of the test fluid at axial segment i at the first time; $P_{i2}$ is a borehole pressure at axial segment i at the second time; $V_{i2}$ is a volume of test fluid at axial segment i at the second time; $T_{i2}$ is a borehole temperature at axial segment i at the second time; and $Z_{i2}$ is a compressibility factor of the test fluid at axial segment i at the second time.

DESCRIPTION OF EMBODIMENTS

A system and method for conducting mechanical integrity testing (MIT) are disclosed herein for conducting MIT testing of a borehole and/or a subterranean storage cavern, or any other cavity. The system and method involves obtaining measurements of wellbore parameters such as distributed borehole temperature and noise with respective Distributed Temperature Sensing (DTS) and Distributed Acoustic Sensing (DAS) systems, uphole and downhole pressure with pressure sensors, and detecting the movement of a fluid interface formed between a test fluid and brine, over the test period. The test fluid can be nitrogen, liquid hydrocarbon, or another suitable fluid. For convenience, it will be assumed herein that nitrogen is used as the test fluid.

Figure 1:
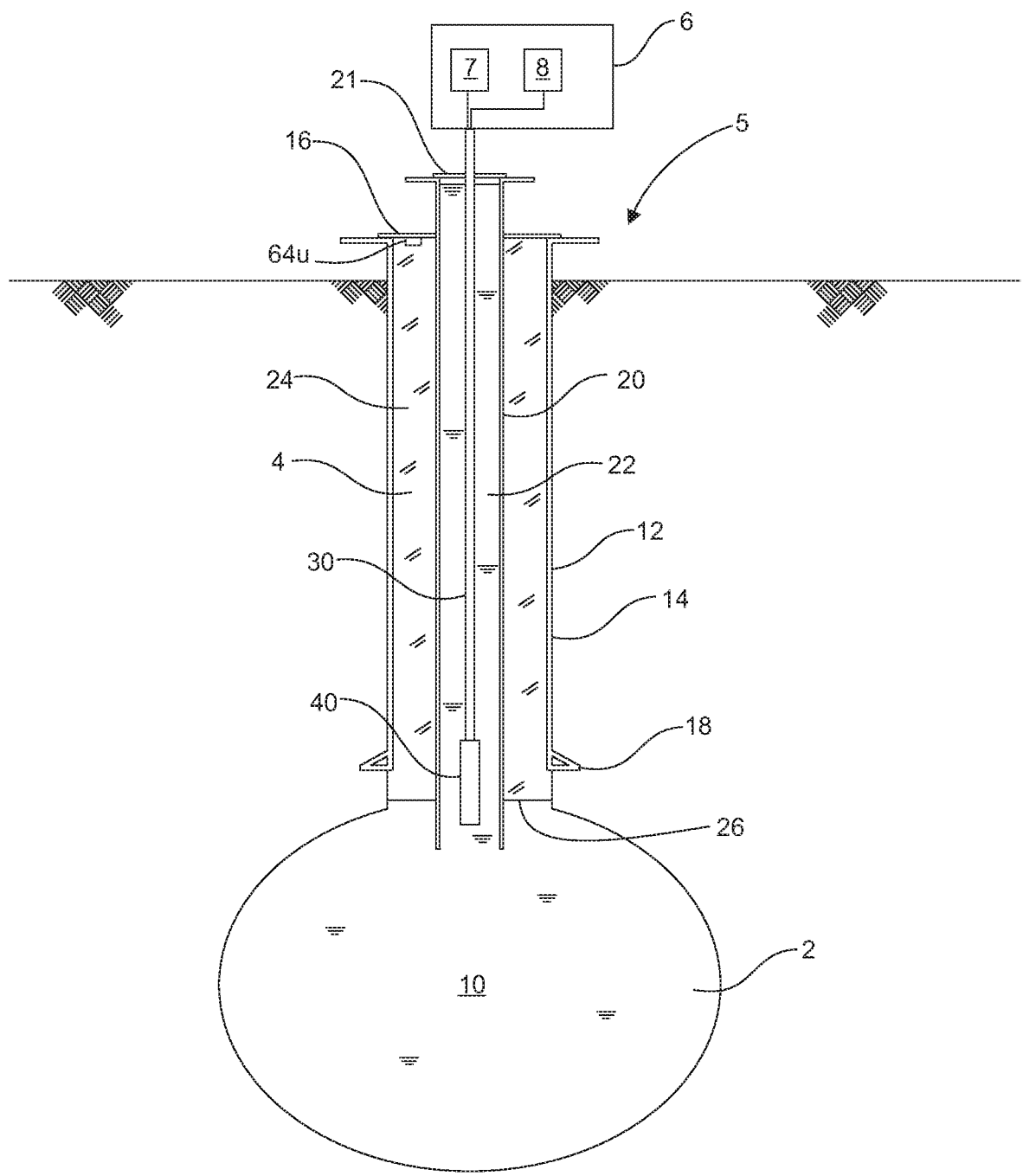
FIG. 1 is a schematic representation of an embodiment of a mechanical integrity testing system for conducting MIT testing on a subterranean cavern.

With reference to FIG. 1, in an embodiment, a borehole 12 extends from a wellhead at surface to a subterranean storage cavern 10. Casing 14, such as steel casing, extends along substantially the length of the borehole 12 and terminates at a casing shoe 18 located adjacent the entrance to the cavern 10. A tubing string 20 is located within borehole 12 and extends from surface into cavern 10. Fluid communication between the wellhead and cavern 10 is permitted via the bore 22 of tubing string 20 and the annulus 24 between the tubing string 20 and casing 14. As described above, during MIT testing procedures the cavern 10 is typically filled with brine 2 and the bottom end of the tubing string 20 is submerged in brine 2 within the cavern 10. In embodiments, wellbore 12 can be uncased.

Figure 2:
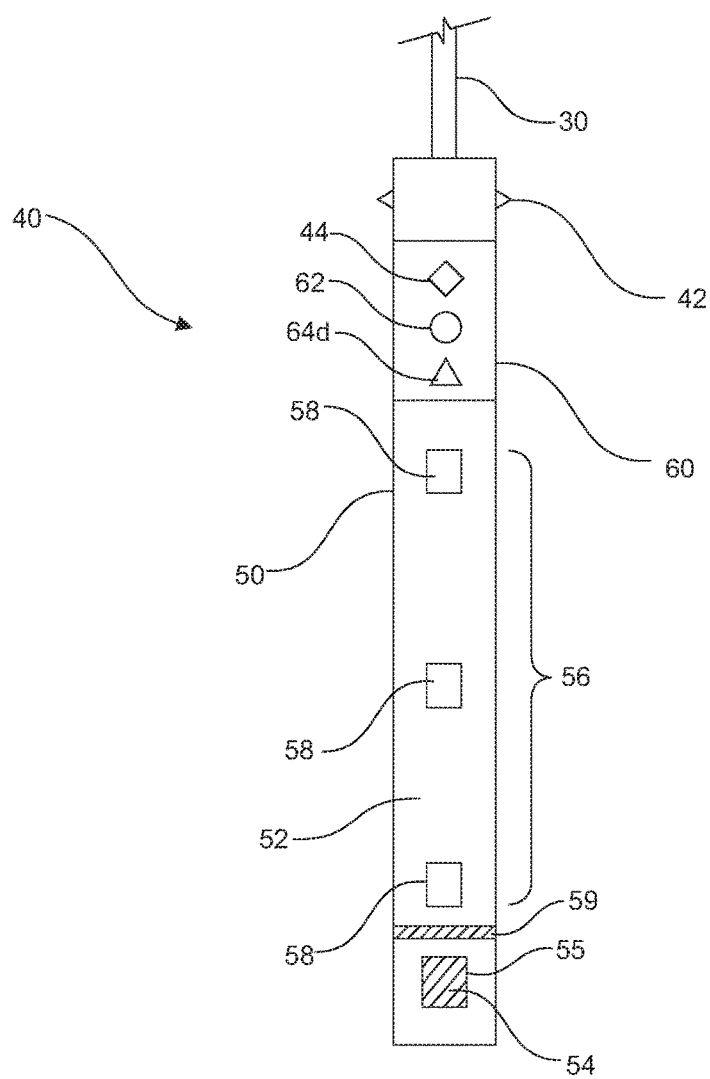
FIG. 2 is a schematic representation of an MIT tool according to embodiments herein.

FIG. 1 depicts an embodiment of an MIT system 5 of the present invention comprising an MIT tool 40 suspended from surface within tubing string bore 22 via a wireline 30 capable of transmitting power and data between a data collection and control system 6 at surface and various sensors and detectors of the MIT system 5. The data collection/control system 6 and wireline 30 can comprise the DTS system and DAS system for measuring and recording temperature and noise, respectively, along a test interval spanning from surface to about a test depth, which defines a desired starting location of a fluid interface 26 between nitrogen and brine 26 during MIT procedures. As best shown in FIG. 2, MIT tool 40 comprises at least an interface detection device 50 and a sensor array 60. MIT tool 40 can also have a casing collar locator 42 and a natural or spectral gamma ray detector 44 configured to detect natural background gamma radiation emitted by the formation to aid in the positioning of the tool. Referring back to FIG. 1, at least one pressure sensor $64u$ can be located at an uphole section of the borehole for measuring and recording uphole borehole pressure.

Turning to FIG. 2, the sensor array 60 can comprise one or more temperature sensors 62 and downhole pressure sensors $64d$. The pressure sensors $64u,64d$ can be selected to obtain real-time, or near real-time, uphole and downhole pressure measurements, respectively. For example, the pressure sensors $64u,64d$ can be quartz or strain pressure sensors, or any other suitable pressure sensor known in the art. The readings from the uphole and downhole borehole pressure sensors $64u,64d$ can be used to calculate a pressure gradient for the test interval, which can be incorporated into the MIT calculations to obtain more accurate results. In an embodiment, a linear pressure gradient can be assumed for the test interval and is sufficient for MIT calculations.

The temperature sensors 62 can be external resistance temperature detectors (RTDs) or other suitable temperature sensors known in the art. Preferably, temperature sensors having high accuracy and reliability, such as an accuracy of at least about 0.1° C., are selected. Occasionally, temperature readings from the DTS can be affected by changing wellbore conditions and darkening of the optical fiber over time, such as via hydrogen darkening. Therefore, in embodiments, the temperature sensors 62 on the MIT tool 40 can be used to calibrate the DTS to compensate for fluctuating wellbore conditions and fiber darkening.

Distributed Temperature Sensing System

Figure 3A:
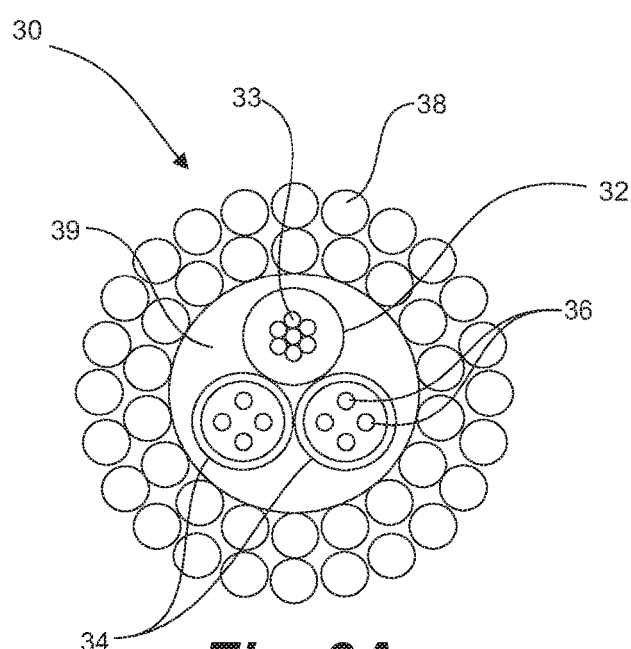
FIG. 3A is a cross-sectional axial view of a wireline to which the MIT tool of FIG. 2 is attached.
Figure 3B:
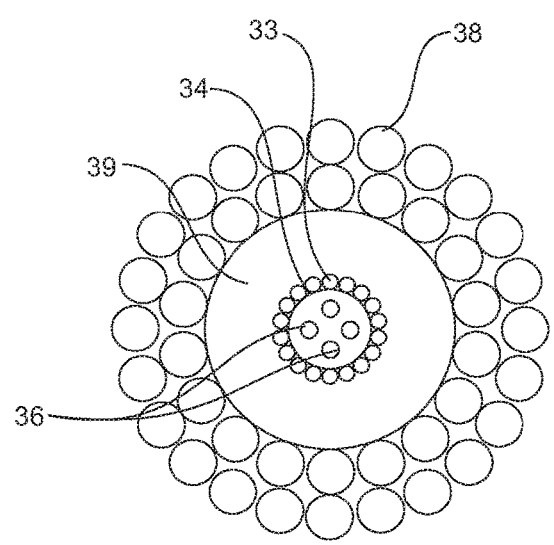
FIG. 3B is a cross-sectional axial view of another embodiment of a wireline to which the MIT tool of FIG. 2 is attached.

With reference to FIGS. 3A and 3B, wireline 30 comprises one or more conductor cables 32 having at least one conductor wire 33 for transmitting power to, and communicating with, the components of the MIT tool 40, one or more optical fiber cables 34, and a plurality of steel wires 38 arranged around the circumference of the wireline 30 for providing strength and protecting interior components. The fiber cables 34 each contain one or more optical fibers 36 coupled to the DTS and/or DAS systems for respectively monitoring temperature and noise along the test interval. In other embodiments, wireline 30 can have a different configuration, for example, with reference to FIG. 3B, two optical fibers 36 inside of a fiber cable/tube 34 with conductor wires 33 located on the outside of the tube 34 and insulation 39 insulating the conductor wires 33, or any other configuration wherein a conductor 33 and a sufficient number of optical fibers 36 are provided for the transmission of power and data required for the MIT operations described herein.

The DTS system comprises a controller 7 (shown in FIG. 1), connected to at least one optical fiber 36 and configured to emit a laser into, and analyze backscattered signals from, the optical fiber 36 to obtain real-time or near real-time distributed or continuous temperature measurements along the length of wireline 30. As shown in FIG. 1, the controller 7 can be integrated into the data collection/control system 6. The DTS system is preferably configured to measure temperature along substantially the entire test interval in axial segments of about 1 meter or less. The length and number of axial segments for temperature measurement can be chosen according to the required resolution for MIT procedures and the speed of data processing available.

The measurement of distributed temperature, together with uphole and downhole pressure, in real-time or near real-time can be used to increase the accuracy, and reduce the duration, of MIT procedures. For example, instead of waiting for the borehole and/or cavern temperature to stabilize (i.e. reach thermal equilibrium) before beginning MIT procedures, the operator can instead incorporate distributed temperature measurements from the DTS and temperature sensors 62, and pressure measurements from pressure sensors 64u,64d, into the gas laws used when calculating the nitrogen leak rate in order to account for temperature and pressure changes during MIT procedures. When temperature and pressure changes are accounted for in the MIT calculations, MIT testing can begin once a stabilized nitrogen leak rate (if any) can be calculated, as opposed to waiting for the temperature between nitrogen 4, brine 2, and formation to reach steady state or equilibrium, which can take days, weeks, or months depending on fluid volume and other factors. As such, the MIT test duration is significantly shortened.

In one exemplary embodiment, assuming there is no leakage in the borehole or cavern, using the combined gas law, the relationship between borehole temperature, borehole pressure, and nitrogen volume over the MIT test period can be stated as $$\frac{P_1 V_1}{T_1} = \frac{P_2 V_2}{T_2}$$

where $P_1$ is the borehole pressure at the beginning of the test period;

$V_1$ is the volume of nitrogen at the beginning of the test period;

$T_1$ is the borehole temperature at the beginning of the test period;

$P_2$ is the borehole pressure at the end of the test period;

$V_2$ is the volume of nitrogen at the end of the test period; and $T_2$ is the borehole temperature at the end of the test period.

To account for the volume of nitrogen lost due to leakage $V_{loss}$ over the test period, the combined gas law can be written as $$\frac{P_1(V_1 - V_{loss})}{T_1} = \frac{P_2 V_2}{T_2}$$

and isolating for $V_{loss}$ results in the equation $$V_{loss} = V_1 - V_2 \left( \frac{T_1}{T_2} \frac{P_2}{P_1} \right)$$

Figure 4:
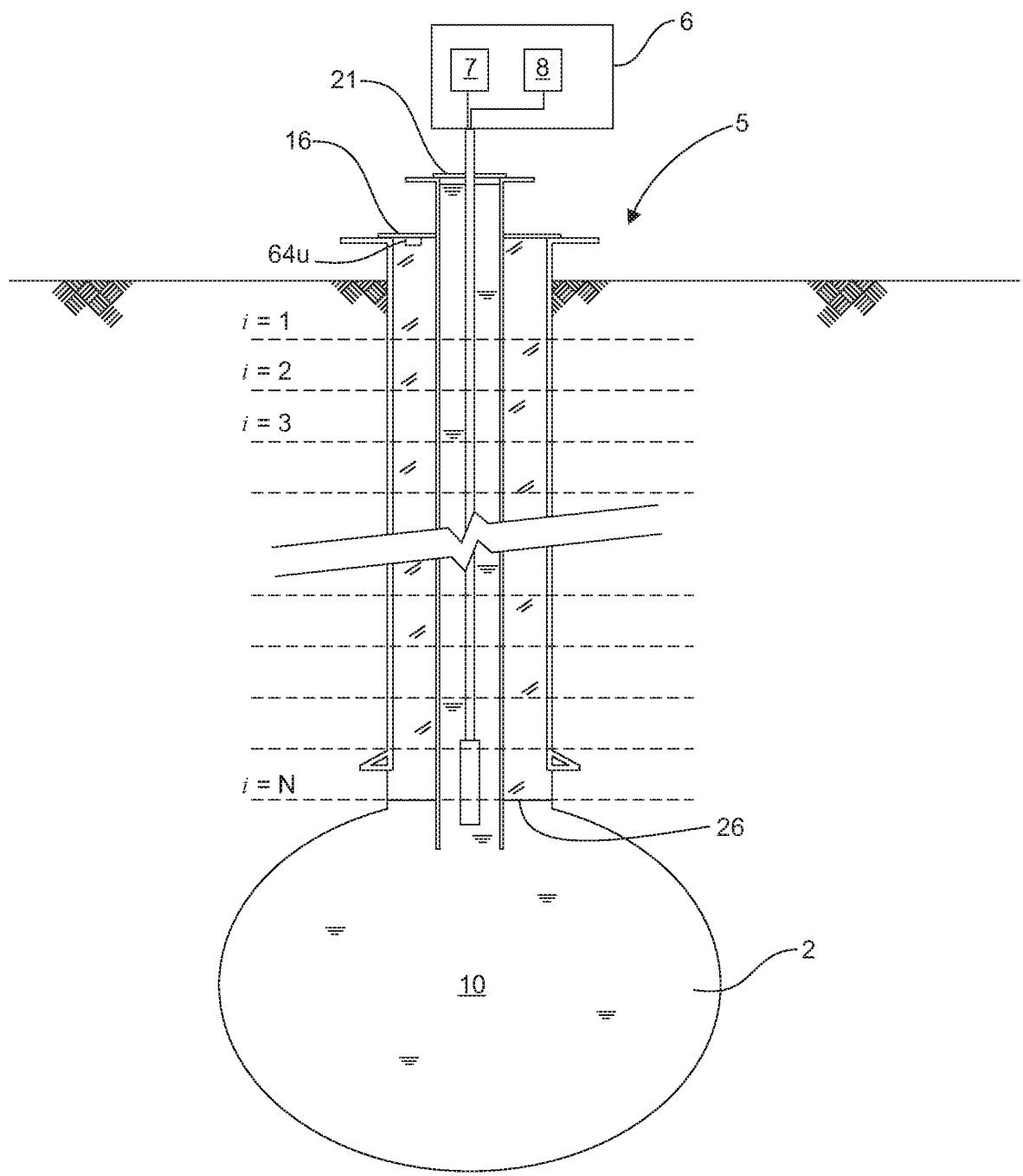
FIG. 4 is a schematic representation of the MIT system of FIG. 1 showing the test interval divided into N segments for the purposes of determining the leaked volume or mass loss of a test fluid.

However, using single-point temperature and pressure measurements in this equation, or average temperature based on temperature log measurements that are hours or days old, can result in inaccurate MIT calculations, as the interface movement could be due to volume change caused by borehole temperature and/or pressure change and not a leak. With reference to FIG. 4, such inaccuracies can be addressed by dividing the test interval into N test segments corresponding to the axial segments sampled by the DTS and calculating $V_{loss}$ for each test segment. The distributed borehole temperature measurements from the DTS and borehole pressure gradient calculated using the uphole and downhole pressure measurements provide the temperature and pressure values for each of the N test segments. Nitrogen leak calculations are thereby performed using the real-time or near real-time temperature measurements of the DTS and pressure sensors 64u,64d, and localized temperature changes along the test interval during the test period are accounted for. The above formula for calculating $V_{loss}$ can be applied to each of the MIT test segments to obtain the volume change for each test segment over the test duration. The volume change of each of the test segments can then be summed to obtain the overall volume change of the nitrogen 4 accounting for localized temperature changes that may not have been considered when using average borehole temperature calculated from a temperature log. In other words, $V_{loss}$ can be calculated for every ith segment of the test interval as $$V_{iloss} = V_{i1} - V_{i2} \left( \frac{T_{i1}}{T_{i2}} \frac{P_{i2}}{P_{i1}} \right)$$

and the $V_{loss}$ for the entire test interval consisting of n segments can be calculated as $$V_{loss} = \sum_{i=1}^{N} V_{i1} - V_{i2} \left( \frac{T_{i1}}{T_{i2}} \frac{P_{i2}}{P_{i1}} \right)$$

The nitrogen leak rate can be calculated as $V_{loss}/t$, where t is the MIT test period. In this embodiment, the temperature of the borehole 12 and cavern 10 do not need to be at equilibrium or steady state as between the nitrogen 4, brine 2, and the formation before the volume change of nitrogen can be calculated, thereby shortening the MIT procedures by days or weeks.

In certain situations, it may be desirable to account for the compressibility of nitrogen in the calculation of $V_{loss}$. This can be done by incorporating compressibility factor Z, which is dependent on pressure and temperature, into the $V_{loss}$ equation above $$V_{loss} = \sum_{i=1}^{N} \left\{ V_{i1} - V_{i2} \left( \frac{T_{i1}}{T_{i2}} \frac{P_{i2}}{P_{i1}} \frac{Z_{i1}}{Z_{i2}} \right) \right\}$$

where $Z_{i1}$ is the compressibility factor of nitrogen at the beginning of the test period at the ith segment; and $Z_{i2}$ is the compressibility factor of nitrogen at the end of the test period at the ith segment.

Compressibility Z can be determined from standard compressibility charts based on pressure and temperature measurements at the relevant segment.

In a non-steady state temperature environment between nitrogen 4, brine 2, and the formation, the calculation of nitrogen leakage can be further improved by calculating the mass loss of nitrogen $m_{loss}$ instead of volume change $V_{loss}$. Calculating $m_{loss}$ can provide a more accurate determination of the presence of a leak, as nitrogen volume can fluctuate depending on pressure and temperature conditions in the borehole 12, while mass is conservative and is not affected by pressure and temperature changes in the borehole 12. Using the ideal gas law with compressibility factor PV=ZnRT, where n is the number of moles of nitrogen, which is a function of mass m and molar mass M of nitrogen, and R is the real gas constant 8.314 J/mol·K. The mass loss $m_{iloss}$ of the ith segment of the test interval can be calculated as $$m_{iloss} = m_{i1} - m_{i2} = \frac{MV_i}{R} \left[ \frac{P_{i1}}{Z_{i1}T_{i1}} - \frac{P_{i2}}{Z_{i2}T_{i2}} \right]$$

where M is the molar mass of nitrogen;

$V_i$ is a constant and is the volume of nitrogen of the ith segment;

R is the real gas constant 8.314 J/mol·K.; and and $T_{i1}$, $P_{i1}$, $Z_{i1}$, $T_{i2}$, $P_{i2}$, and $Z_{i2}$ are the same as described above.

The total mass loss of the test interval $m_{loss}$ can then be calculated as $$m_{loss} = \sum_{i=1}^{N} \left\{ \frac{MV_i}{R} \left( \frac{P_{i1}}{Z_{i1}T_{i1}} - \frac{P_{i2}}{Z_{i2}T_{i2}} \right) \right\}$$

Calculating mass loss of nitrogen 4 is advantageous, as one would not need to wait for thermal equilibrium or steady-state between nitrogen 4, brine 2, and formation to perform accurate MIT calculations, thereby further reducing the duration of MIT procedures.

The above segmented method of calculating nitrogen volume loss $V_{loss}$ and mass loss $m_{loss}$ is more accurate than conventional MIT calculations. However, the segmented method requires measurement of downhole pressure in order to determine a pressure gradient for each test segment, and temperature readings for each test segment. Therefore, the segmented method requires distributed or continuous borehole temperature readings, such as with a DTS, and at least uphole and downhole pressure readings, such as with the uphole and downhole pressure sensors 64u, 64d.

The DTS system can also be used to track the location of the nitrogen/brine interface 26 in order to track the progression of the interface as nitrogen is injected into the borehole 12 in preparation for MIT procedures. More specifically, the DTS system can be used to measure the temperature difference between nitrogen 4 and brine 2 in order to locate the position of the interface 26.

The temperature measurements from the DTS system may become inaccurate over time due changes in borehole conditions or darkening of the fiber. As the temperature measurements obtained by the DTS system at the bottom of the fiber cables 34 adjacent the MIT tool 40 should be the same as the temperature measurements of the temperature sensors 62 of sensor array 60, the temperature sensors 62 can be used to periodically calibrate the DTS system, if needed.

Distributed Acoustic Sensing System

Similar to the DTS system, the DAS system comprises an optical interrogation unit 8, or similar optoelectronic device, connected to at least one optical fiber 35 and configured to emit a laser into, and analyze backscattered signals from, the optical fiber 35 to obtain real-time, or near real-time, acoustic noise measurements along the length of the wireline 30. As shown in FIG. 1, the interrogation unit 8 can be integrated into the data collection/control system 6. The DAS system is preferably configured to measure noise along substantially the entire test interval in axial segments of about 1 meter or less. The length and number of segments for acoustic noise measurement can be chosen according to the required resolution for MIT procedures and the speed of data processing available, and can either be the same axial segments used for the DTS system (i.e. coincident and coextensive segments), or different segments. As noise can be sensed along the wireline 30 by the DAS without moving the wireline 30 or MIT tool 40, the risk of obtaining inaccurate borehole noise measurements due to acoustic disturbances caused by movement of the wireline 30 or tool 40 is reduced.

The distributed or continuous noise measurements obtained throughout the test interval with the DAS can be used to assist in identifying the existence and location of leaks along the test interval. Specifically, a leak in the casing 14 resulting in fluid flow between the borehole 12 and the formation, for example through a leaky joint or hole, produces a distinctive acoustic signal similar to flow through an orifice detectable by the DAS. Such leak identification by the DAS can serve both as a confirmation of the results of the MIT test and an independent leak detection procedure.

MIT Tool

As shown in FIG. 2, interface detection device 50 can be a gamma ray density logging tool comprising a logging tool housing 52 containing at least one gamma ray source 54 and a gamma ray detector array 56 having at least one gamma ray detector 58. In the depicted embodiment, three gamma ray detectors 58 are spaced apart on the housing 52. In alternative embodiments, more or fewer detectors 58 can be used. Gamma ray source 54 can be installed in a source cavity 55 located in housing 52.

The gamma ray source 54 used in the present interface detection device 50 is Iridium-192, which is advantageous as it possesses an energy level comparable to Cesium-137 and a half-life of 73.83 days, compared to a half-life of 30.5 years for Cesium-137 and 5.2 years for Cobalt-60. Iridium-192 decays to 3% of its original radioactivity in about one year, and to less than 0.1% in about two years. As such, Iridium-192 carries greatly reduced environmental and economic risk relative to Cesium-137 and Cobalt-60. In the event the logging tool is lost in the wellbore, it will take less than 2 years to for an Iridium-192 source to decay to safe levels as opposed to about 150 years for Cesium-137 and about 26 years for Cobalt-60. Additionally, the half-life of Iridium-192 is long enough to be usable in MIT testing without decaying to unacceptable levels during MIT procedures.

The detector array 56, sensor array 60, as well as other electronic equipment located above the gamma ray source 54 can be radioactively shielded from direct gamma radiation from the source 54 such that the gamma rays emitted from source 54 do not interfere with the electronic equipment thereabove or trigger false detections of gamma rays scattered from fluids in the annulus 24 by detectors 58. For example, a radiation shield 59 or any other device known in the art can be configured to allow backscattered radiation to reach the detectors 58 while blocking direct radiation from the gamma ray source 54.

In other embodiments, the interface detection device 50 can be a pulsed neutron logging tool or any other suitable interface detection tool known in the art.

Example Procedure

Figure 5:
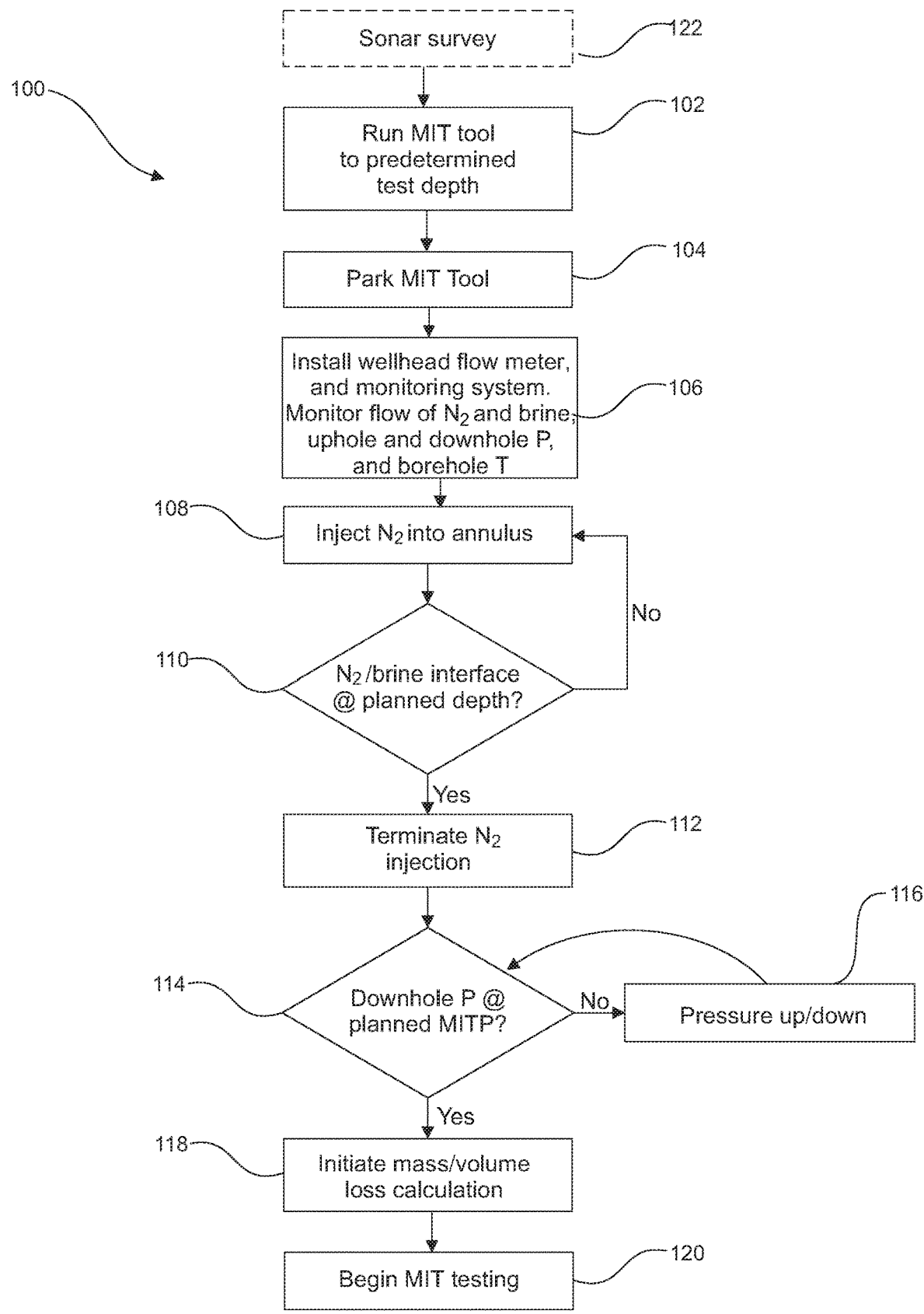
FIG. 5 is a flow diagram depicting an embodiment of the procedure for preparing a wellbore and/or cavern for MIT testing using the MIT system of FIG. 1 and the MIT tool of FIG. 2.

Referring now to FIG. 5, an exemplary procedure 100 for preparing a borehole 12 and/or cavern 10 for MIT testing is provided. In preparation for MIT procedures, at step 102, the MIT tool 40 is first run to a predetermined test depth in the borehole 12 at which the nitrogen-brine interface 26 is to be located. The test depth can be selected using methods and criteria known in the art. At step 104, the MIT tool 40 is parked at the selected test depth.

Wellhead data collection/control system 6 is then installed at the wellhead to monitor fluid flow of nitrogen 4 and brine 2 injected into, or removed from, the borehole 12 using a flowmeter or similar device (step 106). The control system 6 also monitors uphole and downhole pressure using pressure sensors 64$u$,64$d$ and borehole temperature and noise using the DTS, DAS, and temperature sensors 62 (step 106). Afterwards, at step 108, nitrogen 4 is injected into annulus 24, preferably at a constant rate such that the movement of the interface 26 towards the test depth can be more easily monitored, and brine 2 is displaced from the annulus 24 into cavern 10. The distributed temperature readings provided by the DTS can be used to determine the location of the nitrogen-brine interface 26 as the nitrogen 4 displaces brine 2 and moves towards the selected test depth. The data collection/control system 6 continues to monitor real-time or near real-time borehole pressure and temperature, and records time as interface 26 passes the tool 40 and reaches the selected test depth. When the interface 26 reaches the selected test depth, nitrogen injection is terminated, casing valve 16 is closed to prevent borehole fluids from escaping to surface, and downhole pressure is verified to confirm that it is at the downhole MIT test pressure selected based on regulatory requirements (steps 110 and 112). If it is determined that downhole pressure at the test depth is too low, additional nitrogen 4 can be injected to increase borehole pressure (step 116). If pressure at the test depth is too high, either brine 2 can be bled from the system through the inner tubing 20/casing annulus 24 via the tubing valve 21 and/or nitrogen can be bled via the casing valve 16 (step 116).

Whether brine 2 or nitrogen 4 is bled depends on whether the interface 26 should be moved uphole, downhole, or remain in place. Once the nitrogen-brine interface 26 is properly located and downhole pressure is confirmed to be at the desired test pressure, initial calculations for nitrogen leakage and/or mass loss can be performed to determine whether conditions in the borehole 12 and cavern 10 have stabilized enough such that satisfactorily consistent results for nitrogen leakage/mass loss calculations can be obtained (step 118). Once consistent leakage/mass loss calculation results can be obtained, the MIT testing can begin (step 120). Steps 118 and 120 are described in further detail below with reference to FIG. 6.

As one of skill in the art would understand, the above MIT preparation procedure 100 is for exemplary purposes only, and steps may be modified, added, removed, or performed in a different order without departing from the scope of the present invention.

In MIT procedures where the interface 26 is expected to be located below the wellbore casing 14, in a portion of the borehole 12 or cavern 10 significantly larger in diameter than the casing 14, a sonar survey can be performed prior to running a MIT test to determine the volume of the borehole 12 and cavern 10 below the casing shoe 18 (step 122). This volume measurement can be used as part of the MIT procedures for leakage rate calculations. If interface 26 is expected to be located in an area with known volume, for example just below the casing shoe 18, where the borehole 12 could be similar to the size of casing 14, then a sonar survey is not required. Otherwise, a sonar survey is required to map the volume and geometry of the borehole below the shoe 18 or cavern neck to permit accurate injection volume calculations.

Figure 6:
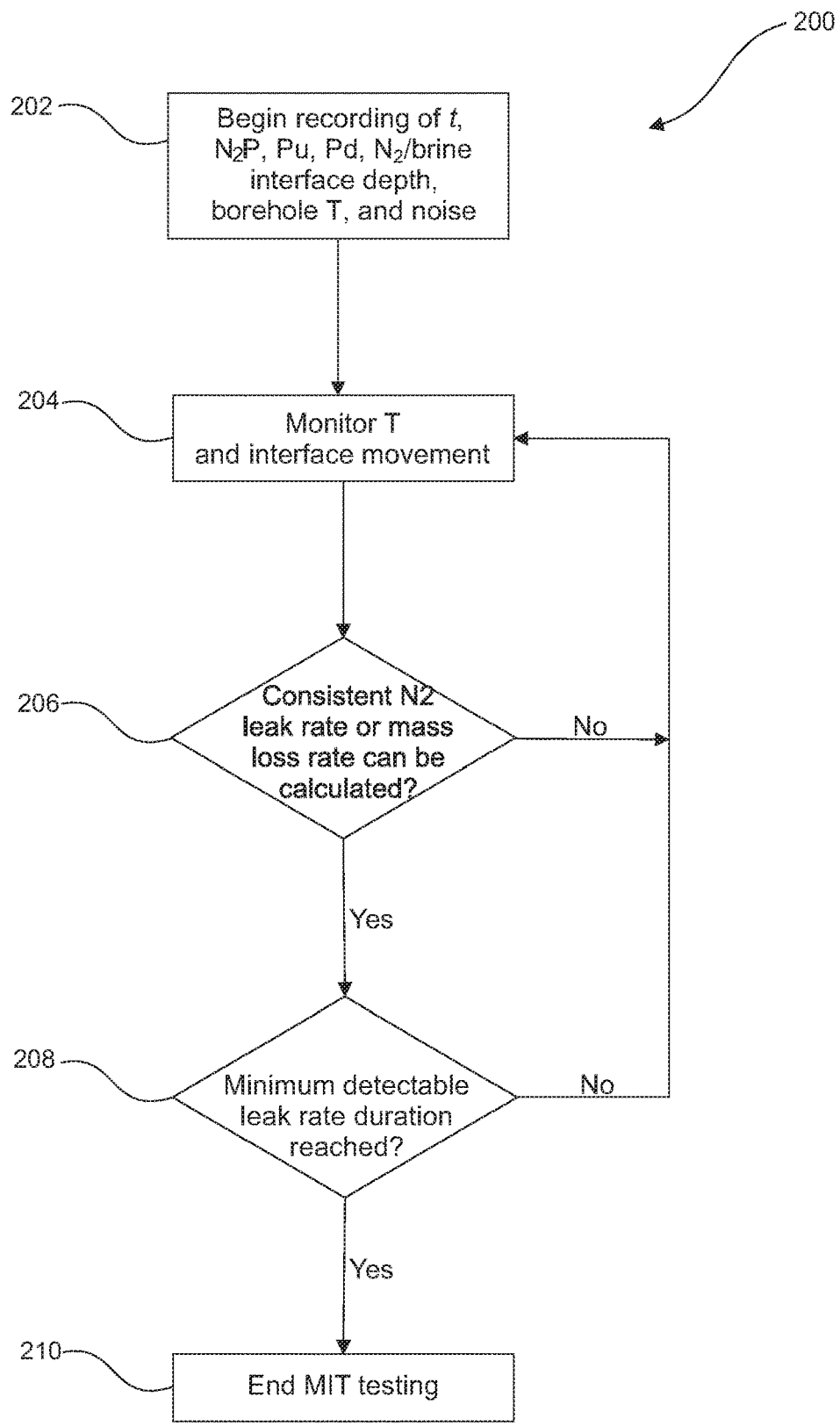
FIG. 6 is a flow diagram depicting an embodiment of the procedure for performing MIT testing using the MIT system of FIG. 1 and the MIT tool of FIG. 2.

With reference to FIG. 6, an exemplary procedure 200 for performing MIT testing is provided. At step 202, surface nitrogen pressure ($N_2P$), uphole and downhole inner tubing 20/annulus 24 brine pressure $P_u$ and $P_d$, respectively, depth of interface 26, and distributed wellbore temperature and acoustic noise measurements are recorded to obtain at least measurements for $V_1$, $P_1$, $T_1$, $V_2$, $P_2$, and $T_2$. Borehole temperature T throughout the test interval is monitored, and any movement of the interface 26 is also monitored (step 204). The MIT test period can begin, and time t initialized to t=0, when the conditions in the borehole 12 and cavern 10 are such that a consistent or stabilized nitrogen leak rate or mass loss rate can be calculated (step 206). When the injection of nitrogen 4 has just been completed, the fluid system in the borehole 12 and/or cavern 10 is unstable. Therefore, calculating nitrogen leakage/mass loss immediately after the completion of nitrogen injection can potentially provide inconsistent results. The results of leakage/mass loss calculations tends to stabilize over time as the system stabilizes. As such, the test period preferably begins (i.e. t=0) when the system has stabilized enough to provide consistent results for leakage/mass loss calculations (step 206). For example, a consistent or stabilized nitrogen leak rate or mass loss rate can be calculated once temperature has stabilized throughout the borehole 12 and/or cavern 10 (i.e. the nitrogen 4, brine 2, and formation have reached thermal equilibrium), or by accounting for the effects of temperature changes in the borehole 12 and/or cavern 10 on the nitrogen leak rate/mass loss equations (i.e. the nitrogen temperature changes and effects are incorporated into the calculations for $V_{loss}$ or $m_{loss}$ using the segmented calculation methods above). MIT testing continues until the time required to achieve a minimum detectable leak rate (MDLR) has been reached (step 208), such as the time determined by the CSA Z341 standard or other applicable standards. The MIT testing period can be concluded once the time required to achieve MDLR is reached (step 210). Typically, the MIT test duration is about 3-7 days. The use of a higher resolution gamma ray density logging tool, as well as distributed temperature and noise sensing along the wireline 30, can reduce the time required to conclude the MIT test. While regulations require that the test period be at least the length of the calculated time to achieve a MDLR, the present system can potentially provide reliable leakage/mass loss calculation results in a shorter period of time.

Measurement of the location of interface 26 is conducted using methods appropriate to the type of interface detection tool being used. For example, for gamma ray density logging tools, the interface 26 can be located by analyzing the gamma rays emitted from the gamma ray source 54 and scattered back towards detectors 58 by the nitrogen 4 or brine 2 in the annulus 24.

Once the data has been collected from the MIT test, the results can be analyzed and used to calculate the nitrogen leak rate, volume loss, and/or mass loss over the test period. Initial nitrogen volume at the start of the MIT test is either known via a calibrated flow meter located on the wellhead (see FIG. 4, step 106), or can be calculated. For example, the compressed volume of nitrogen 4 under pressure can be calculated by the location of the interface 26 and the known dimensions of the annulus 24, borehole 12, and/or cavern 10. The volume of the annulus 24 can be calculated from the inner diameter of the casing 14 and the outer diameter of the tubing 20, and the open hole volume below the casing shoe 18 can be determined from the sonar survey described above.

The combined gas law can be used to calculate the nitrogen leak rate if nitrogen 4, brine 2, and formation temperature reached equilibrium during the MIT procedures. If the effects of temperature changes during the test period are incorporated into the nitrogen leak rate calculation for $V_{loss}$ or $m_{loss}$, reaching temperature equilibrium between the nitrogen 4, brine 2, and formation is not required. Once the nitrogen leak rate is obtained, it is compared to appropriate regulatory standards to determine whether the MIT has passed or failed.

As described above, the mass loss and mass loss rate of nitrogen can be calculated instead of volume loss in order to obtain a leakage rate that is independent of temperature and pressure changes in the borehole 12.

Leak detection using noise measurements from the DAS can be used to verify the MIT test results. This is done by taking a baseline noise reading with the DAS to account for background noise, and then acquiring multiple noise readings at pre-determined time intervals, preferably during the MIT test. Noise signatures indicative of a leak can be compared to the MIT test results as a verification to determine the presence of a leak. Additionally, the location of the leak(s) can be isolated by determining where along the wireline 30 the leak was detected by the DAS by analyzing the DAS noise readings along the wireline 30 for peaks indicative of a leak. The DTS system can also be used to identify the location of a leak, as there is typically a noticeable temperature drop or other temperature anomaly at the location of the borehole 12 adjacent a leak. In this manner, the DTS and DAS systems can be used to quickly identify the location of the leak during or after MIT procedures, whereas in conventional MIT operations, additional noise and temperature logging or joint-by-joint pressure tests must be performed after MIT testing is completed. Further, pressure measurements for the bore 22, annulus 24 and/or other portions of the wellbore can be used to determine if the leak is through the tubing/inner casing 20 or through casing 14 into the formation.

Some MIT procedures require an initial casing MIT test to be performed to confirm the integrity of the casing 14 before regular MIT testing of the cavern. The casing MIT test can be performed in the same manner as the cavern MIT test, but with the interface 26 being located at about the last joints of the casing 14 as opposed to below the casing shoe 18. One the casing MIT test is complete, the interface 26 can be pushed down below the casing shoe 18 by introducing nitrogen 4 as described in the above procedure, thereby preparing the borehole 12 for the cavern MIT test.

The system and method disclosed herein is advantageous as Iridum-192 provides the superior interface detection resolution, accuracy, and logging efficiency of a gamma ray density logger relative to a neutron logging tool, especially when detecting a liquid hydrogen/brine interface or in the presence of foam or oil film, without the environmental, health, and economic risks of a Cesium-137 sourced logger. Additionally, the incorporation of distributed and/or continuous noise measurement throughout the test interval is an innovation that helps to verify MIT test results and locate potential leaks in a single test, thus providing more reliable MIT test results and additional functionality without significantly increasing test times while reducing operational cost by potentially eliminating the need for subsequent leak detection tests.

We claim:

1. A system for conducting mechanical integrity testing of a borehole and underground cavity having a test fluid/brine interface therein, comprising:
    a wireline having at least a conductor, a first optical fiber, and a second optical fiber extending from surface through the borehole to about a test depth adjacent the interface;
    a control system operatively connected to the conductor and the first and second optical fibers at a surface end of the wireline and configured to emit at least a first laser beam through the first optical fiber and analyze the at least first laser beam to measure and record temperatures at a first plurality of axial segments along the first optical fiber, and emit at least a second laser beam through the second optical fiber and analyze the at least second laser beam to measure and record noise readings at a second plurality of axial segments along the second optical fiber;
    a first pressure sensor operatively connected to the control system and configured to detect an uphole pressure at an upper section of the borehole; and
    a mechanical integrity testing tool connected to the conductor and a downhole end of the wireline and having an interface detection device configured to detect the location of the interface and at least a second pressure sensor configured to detect a downhole pressure at about the test depth.

2. The system of claim 1, wherein the mechanical integrity testing tool further comprises at least one temperature sensor.

3. The system of claim 1, wherein the interface detection device comprises a density logging device having an Iridium-192 gamma ray source and at least one gamma ray detector, and a radiation shield located on the mechanical integrity testing tool and configured to shield the mechanical integrity testing tool from direct gamma radiation from the gamma ray source while allowing backscattered gamma radiation to reach the at least one gamma ray detector.

4. The system of claim 1, wherein the first and second pluralities of axial segments comprise coincident axial segments, the length of each axial segment being about 1 meter or less.

5. The system of claim 1, further comprising at least a third pressure sensor located on the wireline.

6. A method for conducting a mechanical integrity test of a borehole and underground cavity having a test fluid/brine interface therein, comprising:
    injecting the test fluid into the borehole to position the interface at a test depth;
    confirming that a pressure in the borehole is at a test pressure;
    closing off the borehole from surface;
    recording an interface level of the interface at a first time and a second time later than the first time, the first time and second time defining a test period;
    emitting at least a first laser beam through a first optical fiber for acquiring temperature measurements at a first plurality of axial segments between surface and the test depth at the first time and the second time;
    acquiring pressure measurements at the first time and the second time, the pressure measurements comprising at least an uphole pressure acquired by a first pressure sensor located at an upper section of the borehole and a downhole pressure acquired by a second pressure sensor located at about the test depth; and
    determining whether test fluid and/or brine has leaked out of the borehole or cavity using the interface level, temperature, and pressure measurements.

7. The method of claim 6, wherein the length of each segment of the first plurality of axial segments is about 1 meter long or less.

8. The method of claim 6, further comprising emitting at least a second laser beam through a second optical fiber for acquiring acoustic noise measurements at a second plurality of axial segments between the surface and the test depth and wherein the step of determining whether test fluid and/or brine has leaked out of the system further comprises using the acoustic noise measurements.

9. The method of claim 8, further comprising the step of identifying the location of a leak using the acoustic noise measurements.

10. The method of claim 8, wherein the second plurality of axial segments are coincident and coextensive with the first plurality of axial segments.

11. The method of claim 6, wherein the steps of recording an interface level, acquiring temperature measurements, and acquiring pressure measurements are performed in substantially real-time.

12. The method of claim 6, wherein the steps of recording an interface level, acquiring temperature measurements, and acquiring pressure measurements further comprise recording an interface level, acquiring temperature measurements, and acquiring pressure measurements at at least a third time between the first time and second time.

13. The method of claim 6, further comprising the step of identifying the location of a leak by using the temperature measurements to locate a temperature anomaly indicative of a leak.

14. The method of claim 6, wherein the step of acquiring pressure measurements further comprises acquiring additional pressure measurements at one or more locations between the upper section of the borehole and the test depth.

15. The method of claim 6, wherein the step of acquiring pressure measurements further comprises calculating a borehole pressure gradient using the pressure measurements.

16. The method of claim 6, wherein the step of determining whether test fluid and/or brine has leaked out of the borehole or cavity further comprises determining a leaked volume of test fluid over the test period for each segment of the first plurality of axial segments.

17. The method of claim 6, wherein the step of determining whether test fluid and/or brine has leaked out of the system further comprises determining a mass loss of test fluid over the test period for each segment of the first plurality of axial segments.

18. A system for conducting mechanical integrity testing of a borehole and underground cavity having a test fluid/brine interface therein, comprising:
    a wireline having at least a conductor, a first optical fiber, and a second optical fiber extending from surface through the borehole to about a test depth adjacent the interface;
    a control system operatively connected to the conductor and the first optical fiber at a surface end of the wireline and configured to emit at least a first laser beam through the first optical fiber and analyze the at least first laser beam to measure and record one of temperature or noise at a first plurality of axial segments along the first optical fiber, and emit at least a second laser beam through the second optical fiber and analyze the at least second laser beam to measure and record another one of temperature or noise at a second plurality of axial segments along the second optical fiber;
    a mechanical integrity testing tool connected to the conductor and a downhole end of the wireline and having an interface detection device configured to detect the location of the interface.

19. The system of claim 18, further comprising:
    a first pressure sensor operatively connected to the control system and configured to detect an uphole pressure at an upper section of the borehole; and
    at least a second pressure sensor located on the mechanical integrity testing tool and configured to detect a downhole pressure at about the test depth.

* * * * *